(12) United States Patent
Ottewill

(10) Patent No.: US 10,658,961 B2
(45) Date of Patent: May 19, 2020

(54) METHOD FOR IDENTIFYING THE DISCRETE INSTANTANEOUS ANGULAR SPEED OF AN ELECTROMECHANICAL SYSTEM

(71) Applicant: ABB Schweiz AG, Baden (CH)

(72) Inventor: James Ottewill, Middlesex (GB)

(73) Assignee: ABB Schweiz AG, Baden (CH)

( * ) Notice: Subject to any disclaimer, the term of this patent is extended or adjusted under 35 U.S.C. 154(b) by 7 days.

(21) Appl. No.: 15/958,317

(22) Filed: Apr. 20, 2018

(65) Prior Publication Data

US 2018/0241332 A1 Aug. 23, 2018

Related U.S. Application Data

(63) Continuation of application No. PCT/EP2016/001569, filed on Sep. 19, 2016.

(30) Foreign Application Priority Data

Oct. 20, 2015 (EP) ..................................... 15460096

(51) Int. Cl.
*H02P 21/16* (2016.01)
*H02P 21/18* (2016.01)
*H02P 23/14* (2006.01)

(52) U.S. Cl.
CPC .............. *H02P 21/16* (2016.02); *H02P 21/18* (2016.02); *H02P 23/14* (2013.01); *H02P 2207/01* (2013.01)

(58) Field of Classification Search
CPC ...... H02P 21/16; H02P 2207/01; H02P 23/14; H02P 21/18
See application file for complete search history.

(56) References Cited

U.S. PATENT DOCUMENTS

| 6,993,439 B2 | 1/2006 | Grosjean |
| 8,373,379 B2 | 2/2013 | Gao et al. |

(Continued)

FOREIGN PATENT DOCUMENTS

| EP | 2120326 A2 | 11/2009 |
| EP | 2523009 A1 | 11/2012 |

OTHER PUBLICATIONS

European Patent Office, International Search Report & Written Opinion issued in corresponding Application No. PCT/EP2016/001569, dated Jan. 20, 2017, 15 pp.

(Continued)

*Primary Examiner* — Kawing Chan
*Assistant Examiner* — Bradley R Brown
(74) *Attorney, Agent, or Firm* — Taft Stettinius & Hollister LLP; J. Bruce Schelkopf

(57) ABSTRACT

A method for identifying the discrete instantaneous angular speed of electromechanical systems in which electrical rotating machinery is used and in which at least one electrical signal is measured during an operation of the electromechanical system. The method includes measuring analog stator current signals and analog stator voltage signals for at least one phase A, B, C, converting the measurements into a digital discrete form, transmitting the digital discrete signals to a computer device wherein data analysis is performed in a processor unit on the basis of a simplified mathematical model of the dynamics of the motor or generator. During the data analysis an average rotor time constant is calculated, an average supply frequency value is identified, an average angular speed is obtained, and an instantaneous phase difference between the discrete stator current signals and the discrete stator voltage signals is determined. The discrete instantaneous angular speed is identified by combining the average supply frequency value, (Continued)

the instantaneous phase difference between the discrete stator current signals and the discrete stator voltage signals, the average rotor time constant, and a number of pole pairs of the electric motor, given by the user. The result of combining the data is stored in a memory of the processor unit.

20 Claims, 4 Drawing Sheets

(56) References Cited

U.S. PATENT DOCUMENTS

| | | | | |
|---|---|---|---|---|
| 2009/0284211 | A1* | 11/2009 | Gao | G01R 31/343 318/727 |
| 2016/0087568 | A1* | 3/2016 | Thomas | H02P 21/24 318/400.02 |
| 2017/0093314 | A1* | 3/2017 | Esvelt | H02P 6/22 |

OTHER PUBLICATIONS

European Patent Office, Extended Search Report issued in corresponding Application No. 15460096.9, dated Apr. 21, 2016, 12 pp.

* cited by examiner

METHOD FOR IDENTIFYING THE DISCRETE INSTANTANEOUS ANGULAR SPEED OF AN ELECTROMECHANICAL SYSTEM

The present invention is concerned with a method for identifying the discrete instantaneous angular speed of electromechanical systems in which electrical rotating machinery is used and in which at least one electrical signal is measured during an operation of the electromechanical system. The instantaneous angular speed may subsequently be used in further applications such as assessing the condition of the electromechanical system.

BACKGROUND OF THE INVENTION

Motor Current Signature Analysis (MCSA) represents a well-known and widely used approach for monitoring the health state of motors and generators. Traditional implementations of MCSA involve the analysis of the frequency spectrum of a measured motor phase current in order to ascertain certain fault modes such as air-gap eccentricity, broken rotor bars and bearing damage. Torsional oscillations can also modulate the phase currents drawn by both synchronous and asynchronous motors resulting in sidebands in the current spectrum that, in theory, may be evaluated to determine the operating state of components connected to the motor. Such spectral analysis has been proposed for monitoring shaft fatigue cycles, load unbalances or shaft misalignments, or oscillations from a connected gearbox in both healthy and faulty conditions.

Traditional implementations of MCSA assume that the operating speed during the measurement period is constant. Often this assumption is valid, particularly in the most prevalent motor applications such as compressors, pumps or fans. However, there are a number of applications where the operating conditions of the motor are not constant. In particular grinding, chipping or pulping applications represent cases where the driving motors are subject to extremely variable loadings. In these applications the motor generally only operates at steady state, under virtually no-load conditions, where it can be difficult to diagnose faults due to the dependence of fault indicator amplitudes on loading. Not only are these applications difficult to analyze using standard methods, they also represent cases where the electrical machine is more likely to suffer failures due to the stresses caused by the non-stationary operating conditions.

From patent description EP 2523009 B1, a known method of monitoring the condition of electromechanical systems by synchronizing measured currents and/or voltages to an estimate of shaft angular position and averaging from rotation to rotation is given. Such a method is able to decouple current signatures relating to the mechanical part of the system from components relating to the electrical side, allowing them to be considered independently. Additionally, the act of linking the magnitude of a measured current to shaft angular positions renders the approach somewhat invariant to non-stationary operating conditions. In order to properly implement this approach, an accurate measure of the shaft speed or angular position is required. Traditionally, such information is recorded by a shaft mounted tachometer or encoder. Such sensors represent an additional cost, can be difficult to install and may be unreliable.

There are a wide range of methods for estimating the speed and torque of an electric motor using measurements of current and voltage. These approaches are often used in so-called 'sensorless' control strategies, which form the basis of many industrial drives. In "Sensorless vector and direct torque control" (Oxford University Press, U K, 1998, ISBN 978-0-19-856465-2), the techniques typically utilized to estimate the speed of a motor are given as open-loop estimators using the monitored stator voltages and currents, estimators using the spatial saturation stator phase third-harmonic voltage, estimators using saliency effects, model reference adaptive systems, observers such as Kalman filters, or Luenberger observers and estimators using Artificial Intelligence methods such as neural networks, fuzzy-logic or fuzzy-neural networks.

Of these categories, the method described in this invention may be most closely associated with the class of speed estimation techniques based on open-loop estimators using stator voltages and currents. The implementation of these open-loop approaches is relatively simple relative to other methods, however their success depends on the accuracy of the parameters in the model of the machine. Typical model parameters include stator resistance, rotor time constant, stator transient inductance and stator self-inductance. In a typical commercial drive the necessary parameters are often determined during an initial identification or self-commissioning run. However, model parameters may vary over the operation of the system due to, amongst others, temperature variations, skin effects and saturation effects. This motivates the use of model reference adaptive systems, observers, and artificial intelligence in control applications which require online estimates of rotor speed. From patent description U.S. Pat. No. 6,993,439 B2 there is a known method of estimating motor speed using currents and voltages for diagnostic purposes using Artificial Intelligence. Specifically, a neural network-based adaptive filter is described. Such approaches require a training period, during which model parameters are fitted to recorded signals.

From patent description U.S. Pat. No. 8,373,379 B2, a further known method of estimating motor speed using currents and voltages for diagnostic purposes is described. The described method may be classed as an estimator using saliency, specifically identifying how current components at the rotor slot harmonic frequency has been modulated by a varying motor speed. In order to apply such methods, knowledge of the machine construction is required, specifically the number of rotor slots. This information is not always readily available.

SUMMARY OF THE INVENTION

In this invention, stator currents and voltages, recorded over a measurement period are analyzed. Utilizing a simplified mathematical model of the dynamics of an electrical machine it is possible to estimate a discrete instantaneous angular speed of an electromechanical system in which electrical rotating machinery is used via rules that are only dependent on one parameter; the average rotor time constant. It is assumed that any inaccuracies in the model due to the simplifying assumptions are accounted for in this estimation process. The method according to the invention is realized according to claims 1 to 14.

This approach gives an accurate measure of the instantaneous angular speed over the course of a measurement period. This instantaneous angular speed may subsequently be utilized in diagnostic algorithms known in the state of the art such as synchronous signal averaging or shaft order analysis, in order to extract diagnostic information. By accounting for non-stationary operating conditions, the invention allows the condition of the electromechanical system to be performed with increased reliability, leading to a reduced likelihood of false or missed alarms. This can help maintenance actions be planned with greater confidence, and prevents unnecessary process stops.

The invention utilizes measurements of motor current and voltage during operation. The sensors required to record these signals are often easier to install than other sensors that may be utilized to estimate the instantaneous angular speed of an electromechanical system. Examples of alternative sensors for estimating the instantaneous angular speed of an electromechanical system include encoders, tachometers or accelerometers. These sensors can be difficult to install due to spatial considerations, inaccessibility or safety considerations. Furthermore, by allowing the condition of the electromechanical system to be ascertained using only currents and voltages, the invention simplifies the monitoring system, reducing costs associated with sensors, cabling and installation.

As the method estimates the rotor time constant for each conducted measurement campaign, it is robust to changes in this parameter due to temperature variations, skin effects and saturation effects. This represents an improvement over speed estimation techniques based on simple open-loop estimators where necessary parameter values are not constantly updated during operation. Additionally, the invention described here does not necessitate a detailed knowledge of the machine construction. Moreover, the rotor time constant estimated using the method may also be trended, with changes potentially indicating a problem in the machine.

In contrast to estimation techniques based on artificial intelligence which account for parametric variation during operation, the invention described here requires no training period in order to fit model parameters and no iterations are required to minimize residual errors. As the method is based on the use of measured data offline, the operations required are relatively straight forward, meaning that the approach is computationally efficient allowing it to be carried out on simple computing devices.

DETAILED DESCRIPTION OF THE INVENTION

Figure 1:
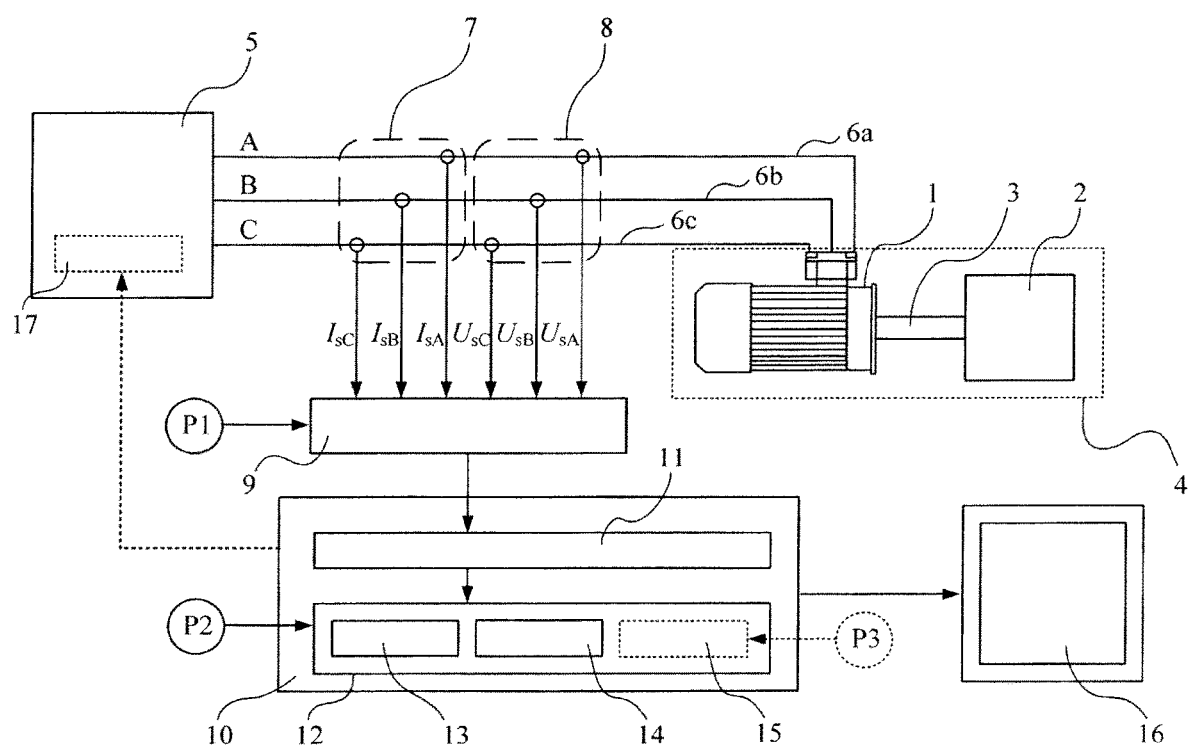
FIG. 1 is a picture of an electromechanical system together with schematic view of the apparatus which may be used in the implementation of the present invention.

Referring to FIG. 1 there is depicted an example schematic of a physical realization of the invention. A three phase asynchronous electric motor 1 is used to drive a piece of rotating machinery 2 via a shaft coupling 3. The three phase asynchronous electric motor 1, the shaft coupling 3, and the rotating machinery 2, together comprise the electromechanical system 4. The electric power supply device 5 provides three-phase alternating current to the asynchronous electric motor 1 by way of power supply cables 6a, 6b and 6c. One or more outputs of current measuring devices 7, and/or voltage measuring devices 8 are connected with other inputs of the data acquisition unit 9. The data acquisition unit 9, which typically takes the form of an analog-to-digital converter is provided with a set of constant parameters P1, which characterize the process of converting the analog waveforms into the discrete signals, specifically the sampling rate $F_s$ and the length of the signal subjected to conversion $T_L$. The current measuring devices 7 and the voltage measuring devices 8 are connected with each of the phases A, B, C of the electric power supply device 5. The data acquisition unit 9 is connected to a computer device 10, with a communication module 11 and a data processing unit 12. In the data processing unit 12 a data storage module 13 and a speed estimation module 14 are implemented. A condition assessment module 15 may also optionally be included along with optional parameters P3 consisting of variables associated with performing condition monitoring, specifically threshold level, W. Some other modules which are necessary for processing and calculating data, not presented in the drawing, are also implemented in the processor. Furthermore, the computer device 10 contains memories RAM and ROM, which are also not presented in the drawing. The computer device 10 is able to communicate the results of the inventive method to an output unit 16 in which the results of the invention are presented to the user. The output unit 16 could be a monitor, a printer, a mobile device such as a smart phone or tablet or any useful device for presentation of the results of the invention. Additionally, the results of the invention may optionally be communicated to an optional control module 17 within the electric power supply device 5 which implements a speed or torque control methodology utilizing the results of the invention. A parameter set P2, consisting of the number of pole pairs of the electric motor 1, p is supplied to the computer device 10, and is stored in the memory for use in subsequent steps.

Figure 2:
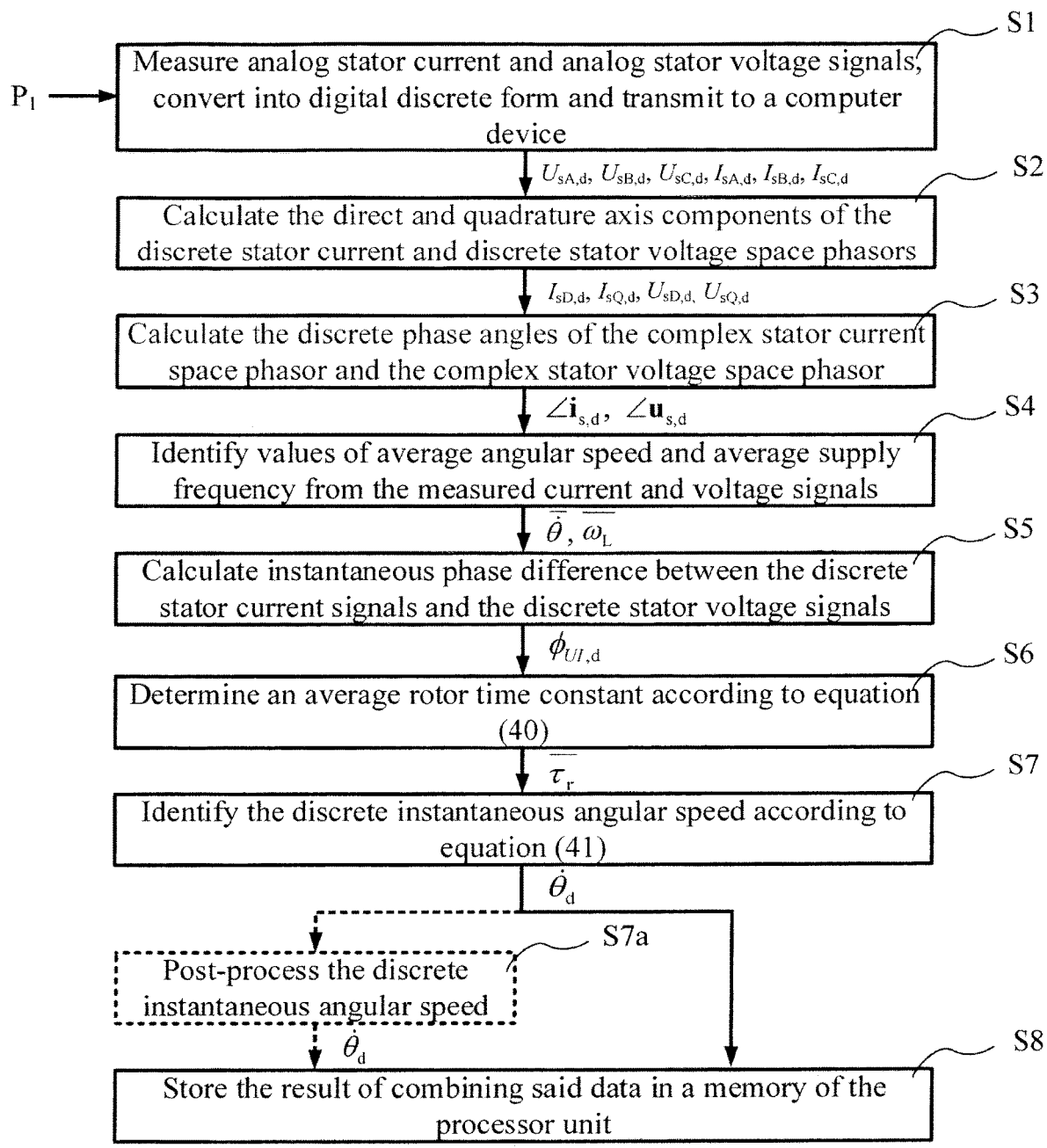
FIG. 2 presents a diagram of operations performed for estimating the speed of the electromechanical system in accordance with the first embodiment of the present invention.

The preferred embodiment of the inventive method is implemented according to the steps S1-S8 shown in FIG. 2.

Step S1

With reference to the electromechanical network shown in FIG. 1 in step S1, analog stator current signals $I_{sA}$, $I_{sB}$, $I_{sC}$ of the alternating current that supplies the stator winding of the three phase asynchronous electric motor 1 for at least one of the phases of the three phase asynchronous electric motor 1 is measured using the current measuring devices 7, and analog stator voltage signals $U_{sA}$, $U_{sB}$, $U_{sC}$ supplying the three phase asynchronous electric motor 1 for at least one of the phases of the three phase asynchronous electric motor 1 are measured using the voltage measuring devices 8. The analog stator current signals $I_{sA}$, $I_{sB}$, $I_{sC}$, which take the form of analog waveforms, are converted to discrete stator current signals $I_{sA,d}$, $I_{sB,d}$, $I_{sC,d}$, respectively. Similarly, the analog stator voltage signals $U_{sA}$, $U_{sB}$, $U_{sC}$, which also take the form of analog waveforms, are converted to discrete stator voltage signals $U_{sA,d}$, $U_{sB,d}$, $U_{sC,d}$, respectively. The data acquisition unit 9, which typically takes the form of an analog-to-digital converter is provided with a set of constant parameters P1, which characterize the process of converting the analog waveforms into the discrete signals, specifically the sampling rate $F_s$ and the length of the signal subjected to conversion $T_L$. The sampling rate $F_s$, which defines the number of samples taken per second, may take any value but a typical minimum rate is 6400 Hz, and this is the default setting. The signal length $T_L$, defines the length of the analog stator current signals $I_{sA}$, $I_{sB}$, $I_{sC}$, and analog stator voltage signals $U_{sA}$, $U_{sB}$, $U_{sC}$, to which the analog-to-digital conversion is applied. The signal length $T_L$, may take any value but a typical minimum length is 20 seconds, and this is the default setting. Considering the discrete stator current signal of the phases of the three phase asynchronous electric motor 1, $I_{sA,d}$ consists of the stator current value $i_{sA,k}$ of k consecutive samples, ranging from the first sample, k=1, to k=N, N being the number of samples contained in the signal. The other discrete electrical signals $I_{sB,d}$, $I_{sC,d}$, $U_{sA,d}$, $U_{sB,d}$, $U_{sC,d}$ may also be described in an analogous way. The conversion process is well known in the art. The discrete stator current signals $I_{sA,d}$, $I_{sB,d}$, $I_{sC,d}$ and the discrete stator voltage signals $U_{sA,d}$, $U_{sB,d}$, $U_{sC,d}$ are automatically transmitted to the computer device 10 via the communication module 11 and stored in the data storage module 13 of the data processing unit 12. Those skilled in the state of the art will recognize that if analog stator current signals $I_{sA}$, $I_{sB}$, $I_{sC}$, and/or analog stator voltage signals $U_{sA}$, $U_{sB}$, $U_{sC}$ from only two of the three supply phases are measured, then the omitted phase measurement can be subsequently derived from the two measured phases using methods known in the state of the art by assuming that the three phase asynchronous electric motor 1 has symmetrical windings.

The Steps S2-S8 find basis in a newly derived, simplified mathematical model of the dynamics of the motor or generator described by Equations (1-28) below. The simplified mathematical model is used to derive an expression for calculating the instantaneous angular speed of the electric motor 1, $\dot{\theta}$ which is used in the inventive method. In order to provide clarity on the logic underlying each of the specific Steps S2-S8, details on the derivation of the simplified mathematical model and the resulting expression for calculating the instantaneous angular speed of the electric motor 1, $\dot{\theta}$, are given here, ahead of providing the description of the Steps S2-S8.

The electric motor 1 is assumed to be a symmetrical AC machine with a smooth-air-gap, and three-phase windings. Linear magnetics is also assumed and complex phenomena such as iron losses, end-effects, and slotting effects are neglected. A complex stator current space phasor $i_s$ may be calculated as the vector addition of the analog stator current signals $I_{sA}$, $I_{sB}$, $I_{sC}$ $$i_s = \tfrac{2}{3}[I_{sA}+aI_{sB}+a^2I_{sC}], \quad (1)$$

where a=exp(j 2π/3). The stator current component of each phase is assumed to act in an angular direction separated 2π/3 radians from the other two phases, with phase A aligned to the real axis. The result will be a two component complex vector, comprised of a direct-axis stator current component $I_{sD}$ and a quadrature-axis stator current component $I_{sQ}$.

$$i_s = I_{sD} + jI_{sQ} \quad (2)$$

where j is an imaginary unit.

Similarly, a complex stator voltage space phasor, $u_s$, may be given as $$u_s = \tfrac{2}{3}[U_{sA}+aU_{sB}+a^2U_{sC}]. \quad (3)$$

A complex rotor current space phasor, $i_r$, may be given as the vector addition of analog rotor current signals $I_{rA}$, $I_{rB}$, $I_{rC}$ of the electric motor 1

$$i_r = \tfrac{2}{3}[I_{rA}+aI_{rB}+a^2I_{rC}]. \quad (4)$$

Similarly, a complex rotor voltage space phasor, $u_r$, may be given as the vector addition of analog rotor voltage signals $U_{rA}$, $U_{sB}$, $U_{rC}$ of the electric motor 1

$$u_r = \tfrac{2}{3}[U_{rA}+aU_{rB}+a^2U_{rC}]. \quad (4)$$

The complex rotor current space phasor, $i_r$, and the complex rotor voltage space phasor, $u_r$, are both given in a reference frame fixed to the rotor of the electric motor 1. An equivalent rotor current space phasor given in the stationary reference frame, $i'_r$, is given by $$i'_r = i_r \exp(-jp\theta), \quad (6)$$

where p is the number of pole pairs of the electric motor 1 and θ is the angular position of the rotor of the electric motor 1. Similarly, an equivalent rotor voltage space phasor given in the stationary reference frame, $u'_r$, is given by $$u'_r = u_r \exp(-jp\theta) \quad (7)$$

A complex stator flux-linkage space phasor, $\Psi_s$, may be given as $$\Psi_s = L_s i_s + L_m i'_r, \quad (8)$$

where $L_s$ is a total three-phase stator inductance of the electric motor 1 and $L_m$ is a three-phase magnetizing inductance of the electric motor 1. A complex rotor flux-linkage space phasor in the stationary reference frame, $\Psi'_r$, is given by $$\Psi'_r = L_r i'_r + L_m i_s, \quad (9)$$

where $L_r$ is the total three-phase rotor inductance of the electric motor 1. The complex stator voltage space phasor, $u_s$, may be described by the stator voltage equations for a smooth-air-gap machine $$u_s = R_s i_s + \dot{\Psi}_s. \quad (10)$$

The complex rotor voltage space phasor in the stationary reference frame, $u'_r$, may be described by the rotor voltage equations for a smooth-air-gap machine $$u'_r = R_r i'_r + \dot{\Psi}'_r - jp\dot{\theta}\Psi'_r, \quad (11)$$

where $\dot{\theta}$ is the instantaneous angular speed of the electric motor 1, $R_s$ is a stator resistance of the electric motor 1 and $R_r$ is a rotor resistance of the electric motor 1. In the case that the electric motor 1 is an induction machine with a squirrel cage rotor, $u'_r = 0$. By substituting Eq. (9) into Eq. (11), it is possible to obtain $$i_s = \frac{L_r}{R_r L_m}\dot{\Psi}'_r + \left(\frac{R_r}{L_r} - jp\dot{\theta}\right)\frac{L_r}{R_r L_m}\Psi'_r. \quad (12)$$

The rotor time constant, $\tau_r$, of the electric motor 1 is defined as $$\tau_r = \frac{L_r}{R_r}, \quad (13)$$

hence it is possible to obtain $$i_s = \frac{\tau_r}{L_m}\dot{\Psi}'_r + \left(\frac{1}{\tau_r} - jp\dot{\theta}\right)\frac{\tau_r}{L_m}\Psi'_r. \quad (14)$$

This equation often forms the basis of rotor-field oriented control algorithms known in the state of the art. Typically for a squirrel cage machine the rotor time constant, $\tau_r$ is relatively large and, as a result, the complex rotor flux-linkage space phasor in the stationary reference frame, $\Psi'_r$, changes slowly in comparison to the complex stator flux-linkage space phasor, $\Psi_s$. Therefore, under standard operation, with no motor faults, the complex rotor flux-linkage space phasor in the stationary reference frame, $\Psi'_r$, can be assumed to be, sinusoidal with a frequency equal to the power supply frequency $\omega_L$ of the electric power supply device 5 and of constant magnitude, $\psi_r$, $$\Psi'_r = \psi_r \exp(j\omega_L t). \tag{15}$$

By substituting Eq. (15) into Eq. (14) it is possible obtain $$i_s = \frac{\tau_r}{L_m}\left(\frac{1}{\tau_r} + j(\omega_L - p\dot\theta)\right)\psi_r \exp(j\omega_L t), \tag{16}$$

where $(\omega_L - p\dot\theta)$ is the angular slip frequency of the electric motor 1. Eq. (15) may be transformed back to stationary coordinates to obtain the currents using the inverse Park Transform which is well known in the state of the art $$\begin{bmatrix} I_{sA} \\ I_{sB} \\ I_{sC} \end{bmatrix} = \begin{bmatrix} 1 & 0 & 1 \\ -\frac{1}{2} & \frac{\sqrt{3}}{2} & 1 \\ -\frac{1}{2} & -\frac{\sqrt{3}}{2} & 1 \end{bmatrix} \begin{bmatrix} I_{sD} \\ I_{sQ} \\ I_{s0} \end{bmatrix}, \tag{17}$$

where $I_{s0}$ is the zero sequence stator current of the electric motor 1 given by $$I_{s0} = \tfrac{1}{3}(I_{sA} + I_{sB} + I_{sC}), \tag{18}$$

which under symmetrical conditions should be equal to zero. Hence; from Eqs. (16-18) it is possible obtain $$I_{sA} = \frac{\psi_r}{L_m}\sqrt{1 + \tau_r^2(\omega_L - p\dot\theta_r)^2}\cos(\omega_L t + \tan^{-1}(\tau_r(\omega_L - p\dot\theta_r))), \tag{19}$$

Rearranging Eq. (9), it is possible obtain $$i'_r = \frac{\Psi'_r}{L_r} - \frac{L_m}{L_r}i_s, \tag{20}$$

which may be substituted into Eq. (8) to obtain $$\Psi_s = \left(L_s - \frac{L_m^2}{L_r}\right)i_s + \frac{L_m}{L_r}\Psi'_r. \tag{21}$$

Combining Eqs. (14-15) with Eq. (21), yields $$\Psi_s = \left(\left(L_s - \frac{L_m^2}{L_r}\right)\frac{\tau_r}{L_m}\left(\frac{1}{\tau_r} + j(\omega_L - p\dot\theta)\right) + \frac{L_m}{L_r}\right)\psi_r\exp(j\omega_L t), \tag{22}$$

which may be differentiated to obtain $$\dot\Psi_s = j\omega_L\left(\left(L_s - \frac{L_m^2}{L_r}\right)\frac{\tau_r}{L_m}\left(\frac{1}{\tau_r} + j(\omega_L - p\dot\theta)\right) + \frac{L_m}{L_r}\right)\psi_r\exp(j\omega_L t) - \\ \left(L_s - \frac{L_m^2}{L_r}\right)\frac{\tau_r}{L_m}jp\ddot\theta\psi_r\exp(j\omega_L t) \tag{23}$$

Eq. (23) may be substituted into Eq. (10) to obtain an expression for the analog complex stator voltage space phasor, $u_s$, assuming a constant rotor flux $$u_s = \left(\left(\frac{R_s}{L_m} - \frac{\tau_r\omega_L}{L_m}(\omega_L - p\dot\theta)\left(L_s - \frac{L_m^2}{L_r}\right)\right) + j\left(\frac{\omega_L}{L_m}\left(L_s - \frac{L_m^2}{L_r}\right) + \right.\right. \\ \left.\left. \frac{\tau_r R_s}{L_m}(\omega_L - p\dot\theta) + \frac{\omega_L L_m}{L_r} - p\ddot\theta\frac{\tau_r}{L_m}\left(L_s - \frac{L_m^2}{L_r}\right)\right)\right)\psi_r\exp(j\omega_L t). \tag{24}$$

This equation can be simplified by assuming ohmic losses to be negligible so that the stator resistance of the electric motor 1 is equal to zero ($R_s = 0$) and assuming that stator and rotor leakage inductances of the electric motor 1 are low, so that ($L_m = L_r = L_s$)

$$u_s = j\omega_L \psi_r \exp(j\omega_L t). \tag{25}$$

Again, applying the inverse Park Transform given by Eq. (17) and assuming that the zero sequence current of the electric motor 1 are negligible, it is possible to obtain an expression for the analog stator voltage signals $U_{sA}$, $U_{sB}$, $U_{sC}$. For example for phase A $$U_{sA} = \omega_L \cos\left(\omega_L t + \frac{\pi}{2}\right). \tag{26}$$

From Eq. (26) and Eq. (19) it is possible to establish the phase difference between the analog stator current signals $I_{sA}$, $I_{sB}$, $I_{sC}$ and the analog stator voltage signals $U_{sA}$, $U_{sB}$, $U_{sC}$, $\phi_{UI}$, as $$\phi_{UI} = \angle u_s - \angle i_s = \frac{\pi}{2} - \tan^{-1}(\tau_r(\omega_L - p\dot\theta)), \tag{27}$$

where $\angle i_s$ is the phase angle of the complex stator current space phasor $i_s$ and $\angle u_s$, is the phase angle of the complex stator voltage space phasor $u_s$. Hence, by rearranging Eq. (27) we may obtain an expression describing the instantaneous angular speed of the electric motor 1, $\dot\theta$, in terms of the phase difference between the analog stator current signals $I_{sA}$, $I_{sB}$, $I_{sC}$ and the analog stator voltage signals $U_{sA}$, $U_{sB}$, $U_{sC}$, $\phi_{UI}$, the rotor time constant, $\tau_r$, and power supply frequency $\omega_L$ of the electric power supply device 5

$$\dot\theta = \frac{1}{p\tau_r}\left(\omega_L \tau_r + \tan\left(\phi_{UI} - \frac{\pi}{2}\right)\right). \tag{28}$$

Though this derivation has been given considering continuous, analog signals, the same results apply for equivalent discrete signals.

Step S2

In Step 2, the direct- and quadrature-axis components of the discrete space phasors of the stator current and stator voltage of the electric motor 1 are calculated. The direct-axis discrete stator current signal $I_{sD,d}$ is calculated according to the formula:

$$I_{sD,d} = \frac{2}{3}\left(I_{sA,d} - \frac{1}{2}I_{sB,d} - \frac{1}{2}I_{sC,d}\right). \tag{29}$$

The quadrature-axis discrete stator current signal $I_{sQ,d}$ is calculated according to the formula:

$$I_{sQ,d} = \frac{1}{\sqrt{3}}(I_{sB,d} - I_{sC,d}). \tag{30}$$

The direct-axis discrete stator voltage signal $U_{sD,d}$ is calculated according to the formula:

$$U_{sD,d} = \frac{2}{3}\left(U_{sA,d} - \frac{1}{2}U_{sB,d} - \frac{1}{2}U_{sC,d}\right). \tag{31}$$

The quadrature-axis discrete stator current signal $U_{sQ,d}$ is calculated according to the formula:

$$U_{sQ,d} = \frac{1}{\sqrt{3}}(U_{sB,d} - U_{sC,d}). \tag{32}$$

Note that other methods, known in the state of the art, may also be applied in order to achieve Step S2.

Step S3

In Step S3 the instantaneous phase angles of the stator current and stator voltage space phasors are calculated. The discrete phase angle of the complex stator current space phasor, $\angle i_{s,d}$ is calculated according to the formula:

$$\angle i_{s,d} = \tan^{-1}\left(\frac{I_{sQ,d}}{I_{sD,d}}\right). \tag{33}$$

Absolute jumps in the value of the discrete phase angle of the complex stator current space phasor, $\angle i_{s,d}$ which are greater than or equal to pi radians are converted to their 2 pi complement using methods known in the state of the art. The discrete phase angle of the complex stator voltage space phasor, $\angle u_{s,d}$ is calculated according to the formula:

$$\angle u_{s,d} = \tan^{-1}\left(\frac{U_{sQ,d}}{U_{sD,d}}\right). \tag{34}$$

Absolute jumps in the value of the discrete phase angle of the complex stator voltage space phasor, $\angle u_{s,d}$ which are greater than or equal to pi radians are converted to their 2 pi complement using methods known in the state of the art.

Those skilled in the state of the art will recognize that there are other methods for calculating the discrete phase angle of the complex stator voltage space phasor, $\angle u_{s,d}$ and the discrete phase angle of the complex stator current space phasor, $\angle i_{s,d}$. For example, the instantaneous phase of a measurement may be obtained by calculating the phase angle of the analytic signal of a single measured phase current or voltage obtained by using the Hilbert transform.

Step S4

In Step S4, estimates of the average supply frequency and average angular speed during the measurement period are calculated. There are a number of methods for estimating the average power supply frequency $\overline{\omega_L}$ which should be known to those skilled in the state of the art. In the preferred embodiment, the DFT (Discrete Fourier Transform) is calculated for at least one of the discrete stator current signals $I_{sA,d}$, $I_{sB,d}$, $I_{sC,d}$, or the discrete stator voltage signals $U_{sA,d}$, $U_{sB,d}$, $U_{sC,d}$. The DFT operation transforms the signal from the time domain into a signal in the frequency domain allowing spectral analysis to be performed; the details of such calculation including algorithms used to compute the DFT, such as the Fast Fourier Transform, are well known to those skilled in the art. Through spectral analysis, which is also well known in the state of the art, the average power supply frequency $\overline{\omega_L}$ is calculated as the frequency at which the amplitude component of the frequency domain signal is greatest.

A number of methods known to those skilled in the state of the art are also available for calculating the average angular speed of the electric motor 1, $\dot{\theta}$. In the preferred embodiment of the invention the spectrum of the magnitude of the current space phasor is calculated and used to estimate the average angular speed during the measurement period on the basis of the initial speed estimate. The magnitude of the discrete stator current space phasor $|i_{s,d}|$ may be calculated according to the formula:

$$|i_{s,d}| = \sqrt{I_{sD,d}^2 + I_{sQ,d}^2}. \tag{35}$$

Taking the magnitude of the space phasor is equivalent to performing a demodulation of a single phase signal, without the necessity of adhering to Bedrossian conditions, hence the average angular speed should appear as a clear peak in the spectrum, and not as a sideband of the supply. The average angular speed of the electric motor 1, $\dot{\theta}$ is estimated by finding the location of the highest peak in a window around an initial speed estimate, $\dot{\theta}_{est}$. There are a number of ways known in the state of the art for obtaining an initial speed estimate, $\dot{\theta}_{est}$. A simple method, given in this embodiment allows the initial speed estimate to be calculated according to the formula:

$$\dot{\theta}_{est} = \frac{\overline{\omega_L}}{p}. \tag{36}$$

Note that the ultimate goal of Step S4 is to obtain the average angular slip frequency given by $(\overline{\omega_L} - p\dot{\theta}_r)$. Those skilled in the state of the art will recognize that this value may also be obtained directly by performing spectral analysis on the discrete stator current signals $I_{sA,d}$, $I_{sB,d}$, $I_{sC,d}$, by identifying components in the spectra which occur at twice the slip frequency; a component which regularly appears in such spectra.

Step S5

In Step S5 the instantaneous phase difference between the discrete stator current signals and the discrete stator voltage signals, $\phi_{UI,d}$, is calculated. As phase-phase voltages lead phase-neutral voltages by 30 degrees, if the motor connections are phase-phase, an additional correction to remove this 30 degree phase shift is required. Therefore if the electric motor 1 is connected in star, the instantaneous phase difference between the discrete stator current signals and the discrete stator voltage signals, $\phi_{UI,d}$, is calculated according to the formula:

$$\phi_{UI,d} = \angle u_{s,d} - \angle i_{s,d}. \tag{37}$$

If the electric motor 1 is connected in delta, the discrete instantaneous phase difference between the discrete stator current signals and the discrete stator voltage signals, $\phi_{UI,d}$, is calculated according to the formula:

$$\phi_{UI,d} = \angle u_{s,d} - \angle i_{s,d} - \frac{\pi}{6}. \tag{38}$$

Step S6

At Step S6 the arithmetic mean of the instantaneous phase difference between the discrete stator current signals and the discrete stator voltage signals, $\overline{\phi_{UI}}$ is calculated according to the formula:

$$\overline{\phi_{UI}} = \frac{1}{N}\sum_{k=1}^{N} \phi_{UI,d,k}, \quad (39)$$

where k is the sample number $\phi_{UI,d,k}$ is the kth value of the discrete stator current signals and the discrete stator voltage signals, and N is the total number of samples in the calculated phase difference. As a consequence of the derived Eq. (28), the average rotor time constant, $\overline{\tau_r}$, is calculated according to the formula:

$$\overline{\tau_r} = \frac{\tan\left(\frac{\pi}{2} - \overline{\phi_{UI}}\right)}{\left(\overline{\omega_L} - p\overline{\dot{\theta}}\right)}. \quad (40)$$

Eq. (40) is obtained from Eq. (28), by replacing instantaneous values by their equivalent average values.

Step S7

At Step S7 the discrete instantaneous angular speed of the electric motor 1, $\dot{\theta}_d$ is calculated according to the formula:

$$\dot{\theta}_d = \frac{1}{p\overline{\tau_r}}\left(\overline{\omega_L}\overline{\tau_r} + \tan\left(\phi_{UI,d} - \frac{\pi}{2}\right)\right). \quad (41)$$

Eq. (41) is obtained, from Eq. (28), by replacing specific instantaneous values by their equivalent average values.

Step S7a

Additionally, at Step S7a the discrete instantaneous angular speed of the electric motor 1, $\dot{\theta}_d$ may be optionally post-processed, for example using low pass filtering methods known by those skilled in the state of the art in order to remove high frequency components, for example those which occur due to higher harmonics.

Step S8

At Step S8 the result of combining said data is stored in a memory of the data storage module 13.

Figure 3:
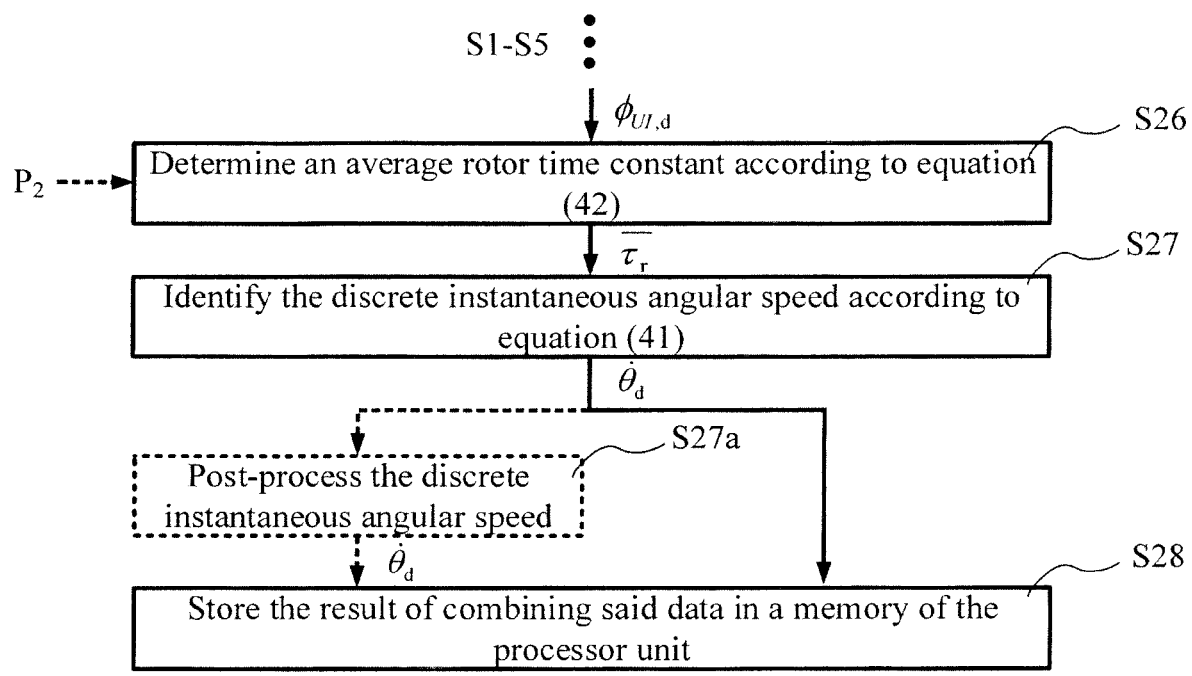
FIG. 3 presents a part of the diagram of operations performed for estimating the speed of the electromechanical system in accordance with the second embodiment of the present invention.

A second embodiment of inventive method is implemented according to the steps S26-S28 shown in FIG. 3. In FIG. 3 Step S26 takes the values calculated outputs from Steps S1-S5 from the previous embodiment as inputs. Step S27 is identical to Step S7, Step S27a is identical to Step S7a and Step S28 is identical to Step S8. In this second embodiment, at Step S26 the power factor of the electric motor 1, $\phi_{PF}$, is identified either from the discrete stator current signals $I_{sA,d}, I_{sB,d}, I_{sC,d}$ and the discrete stator voltage signals $U_{sA,d}, U_{sB,d}, U_{sC,d}$ using methods known in the state of the art, or is identified as part of parameter set P2 of the parameter set input by the user. Also at step S26 the average rotor time constant, $\overline{\tau_r}$, is calculated using the power factor of the electric motor 1, $\phi_{PF}$, according to the formula:

$$\overline{\tau_r} = \frac{\tan\left(\frac{\pi}{2} - \cos^{-1}(\phi_{PF})\right)}{\left(\overline{\omega_L} - p\overline{\dot{\theta}}\right)}. \quad (42)$$

Figure 4:
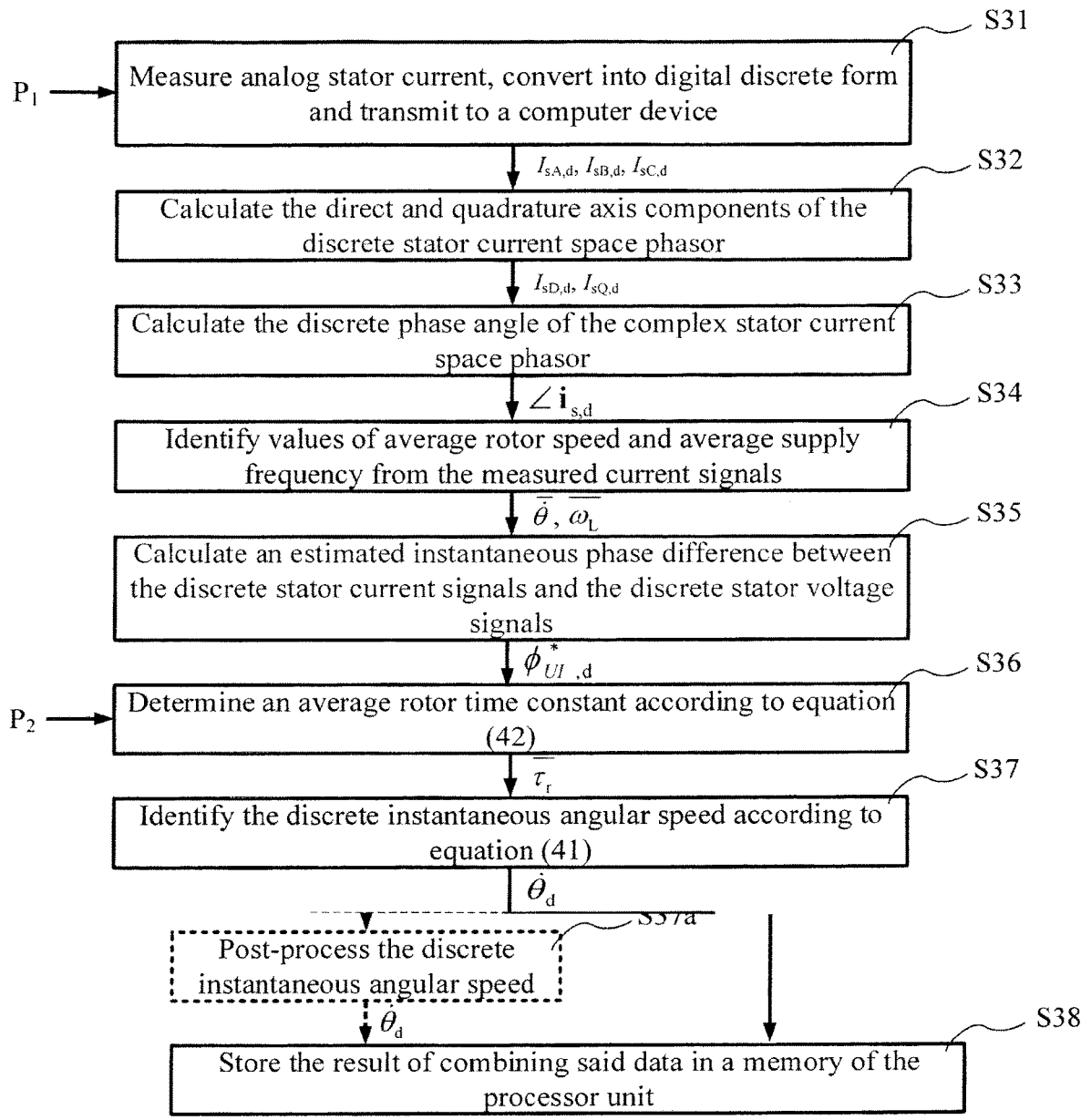
FIG. 4 presents a diagram of operations performed for estimating the speed of the electromechanical system in accordance with a third embodiment of the present invention which allows an average rotor time constant to be calculated from the power factor of the electric motor.

A third embodiment of inventive method is implemented according to the steps S31-S38 shown in FIG. 4. In FIG. 4, Steps S31-S34 are identical to steps S1-S4 respectively in all aspects, with the exception that analog stator voltage signals $U_{sA}, U_{sB}, U_{sC}$ and values subsequently derived utilizing these analog stator voltage signals $U_{sA}, U_{sB}, U_{sC}$ are omitted. At Step S35 an estimated instantaneous phase difference between the discrete stator current signals and the discrete stator voltage signals $\phi^*_{UI,d}$ is calculated purely on the basis of the discrete phase angle of the complex stator current space phasor, $\angle i_{s,d}$, according to the formula:

$$\phi^*_{UI,d} = \cos^{-1}(\phi_{pf}) + f(\angle i_{s,d}) - \angle i_{s,d}. \quad (43)$$

where $f(\angle i_s)$ is a first order polynomial fitted to the discrete phase angle of the complex stator current space phasor, $\angle i_{s,d}$ using methods known in the state of the art, such as linear regression. At Step S36 the power factor of the electric motor 1, $\phi_{PF}$, is taken from nameplate values input as part of parameter set P2. At the same step the average rotor time constant, $\overline{\tau_r}$, is calculated at Step S36 using the power factor of the electric motor 1, $\phi_{PF}$, according to the formula (42). Subsequent Steps S37 S38 are identical to Steps S7-S8 respectively, albeit with the estimated instantaneous phase difference between the discrete stator current signals and the discrete stator voltage signals $\phi^*_{UI,d}$ used instead of the instantaneous phase difference between the discrete stator current signals and the discrete stator voltage signals $\phi_{UI,d}$.

The use of the invention according to previous embodiments wherein the discrete instantaneous angular speed of the electric motor 1, $\dot{\theta}_d$ is further processed in the optional condition assessment module 15 using methods known in the state of the art, in order to extract key condition parameters. An example key condition parameter is the range of the discrete instantaneous angular speed of the electric motor 1, calculated as the difference between the maximum and minimum values of the discrete instantaneous angular speed of the electric motor 1, $\dot{\theta}_d$. Those skilled in the state of the art will recognize that other key condition parameters might be created from the discrete instantaneous angular speed of the electric motor 1, $\dot{\theta}_d$, particularly when it is combined with other recorded signals, as an input to a condition assessment method known in the state of the art, which utilizes instantaneous angular speed in order to allow non-stationary signals to be analyzed. Examples of such approaches include synchronous signal averaging, or shaft order analysis. The calculated key condition parameter is compared to a threshold level, W input as part of optional Parameters P3. If the key condition parameter exceeds threshold level, W, an alarm is indicated to the end user via the output unit 16, and the key condition parameter is stored in a memory of the processing unit. If the key condition parameter does not exceed the threshold level, W, key condition parameter is stored in a memory of the processing unit.

A further use of the invention according to previous embodiments wherein the average rotor time constant, $\overline{\tau_r}$, and the discrete-instantaneous angular speed of the electric motor 1, $\dot{\theta}_d$ is communicated to the optional control module 17 within the electric power supply device 5. The electric power supply device 5 may be a variable-frequency drive. The optional control module subsequently implements a speed or torque control methodology utilizing the average rotor time constant, $\overline{\tau_r}$ and/or the discrete instantaneous angular speed of the electric motor 1, $\dot{\theta}_d$ as part of a control algorithm known in the state of the art.

A further use of the invention according to previous embodiments wherein the average rotor time constant, $\overline{\tau_r}$ is further processed in the optional condition assessment module 15. The average rotor time constant, $\overline{\tau_r}$, is compared to a threshold level, W input as part of optional Parameters P3. If the average rotor time constant, $\overline{\tau_r}$, exceeds threshold level, W, an alarm is indicated to the end user via the output unit 16, and the key condition parameter is stored in a memory of the processing unit. If the average rotor time constant, $\overline{\tau_r}$, does not exceed the threshold level, W, key condition parameter is stored in a memory of the processing unit.

A computer program for identifying the discrete instantaneous angular speed of a motor or generator of an electromechanical system 4, which computer program is loadable in and executable on a data processing unit 12 and which computer program performs when being executed by the data processing unit of a computer device, the method according to claims 1-12.

NOMENCLATURE

| Letter | Name |
|---|---|
| A, B, C | phases of the electric power supply device |
| P2 | parameter set consisting of the number of pole pairs of the electric motor |
| P | number of pole pairs of the electric motor |
| $I_{sA}, I_{sB}, I_{sC}$ | analog stator current signals |
| $U_{sA}, U_{sB}, U_{sC}$ | analog stator voltage signals |
| $I_{sA, d}, I_{sB, d}, I_{sC, d}$ | discrete stator current signals |
| $U_{sA, d}, U_{sB, d}, U_{sC, d}$ | discrete stator voltage signals |
| P1 | parameters which characterize the process of converting the analog waveforms into the discrete signals |
| $F_s$ | sampling rate |
| $T_L$ | length of the signal subjected to conversion |
| $i_{sA, k}$ | stator current value |
| N | number of samples contained in the signal |
| $\dot{\theta}$ | instantaneous angular speed of the electric motor |
| $i_s$ | complex stator current space phasor |
| $I_{sD}$ | direct-axis stator current component |
| $I_{sQ}$ | quadrature-axis stator current component |
| J | imaginary unit |
| $u_s$ | complex stator voltage space phasor |
| $i_r$ | complex rotor current space phasor |
| $I_{rA}, I_{rB}, I_{rC}$ | analog rotor current signals |
| $u_r$ | complex rotor voltage space phasor |
| $U_{rA}, U_{rB}, U_{rC}$ | analog rotor voltage signals |
| $i'_r$ | rotor current space phasor given in the stationary reference frame |
| $\Theta$ | instantaneous angular position of the rotor of the electric motor |
| $u'_r$ | rotor voltage space phasor given in the stationary reference frame |
| $\Psi_s$ | complex stator flux-linkage space phasor |
| $L_s$ | total three-phase stator inductance of the electric motor |
| $L_m$ | three-phase magnetizing inductance of the electric motor |
| $\Psi_r$ | complex rotor flux-linkage space phasor in the stationary reference frame |
| $L_r$ | total three-phase rotor inductance of the electric motor |
| $u'_r$ | complex rotor voltage space phasor in the stationary reference frame |
| $R_s$ | stator resistance of the electric motor |
| $R_r$ | rotor resistance of the electric motor |
| $\tau_r$ | rotor time constant |
| $\omega_L$ | power supply frequency |
| $\psi_r$ | rotor flux-linkage magnitude |
| $I_{s0}$ | zero sequence stator current of the electric motor |
| $\phi_{UI}$ | phase difference between the analog stator current signals $I_{sA}, I_{sB}, I_{sC}$ and the analog stator voltage signals $U_{sA}, U_{sB}, U_{sC}$. |
| $\angle i_s$ | phase angle of the complex stator current space phasor $i_s$ |
| $\angle u_s$ | phase angle of the complex stator voltage space phasor $u_s$ |
| $I_{sD, d}$ | direct-axis discrete stator current signal |
| $I_{sQ, d}$ | quadrature-axis discrete stator current signal |
| $U_{sD, d}$ | direct-axis discrete stator voltage signal |
| $U_{sQ, d}$ | quadrature-axis discrete stator current signal |
| $\angle i_{s, d}$ | discrete phase angle of the complex stator current space phasor |
| $\angle u_{s, c}$ | discrete phase angle of the complex stator voltage space phasor |
| $\overline{\omega_L}$ | average power supply frequency |
| $\overline{\dot{\theta}}$ | average angular speed of the electric motor |
| $|i_{s, d}|$ | magnitude of the discrete stator current space phasor |
| $\dot{\theta}_{est}$ | initial speed estimate |
| $\phi_{UI, d}$ | instantaneous phase difference between the discrete stator current signals and the discrete stator voltage signals |
| $\overline{\phi_{UI}}$ | arithmetic mean of the instantaneous phase difference between the discrete stator current signals and the discrete stator voltage signals |
| $\overline{\tau_r}$ | average rotor time constant |
| $\dot{\theta}_d$ | discrete instantaneous angular speed of the electric motor |
| $f(\angle i_s)$ | first order polynomial fitted to the discrete phase angle of the complex stator current space phasor |
| $\phi_{PF}$ | power factor of the electric motor |
| P3 | parameter set consisting of alarm thresholds for condition monitoring |
| W | Threshold level |

The invention claimed is:

1. A method for identifying a discrete instantaneous angular speed $\dot{\theta}_d$ of a motor or generator of an electromechanical system, by measuring analog stator current signals $I_{sA}$, $I_{sB}$, $I_{sC}$ for at least one phase A, B, C, and analog stator voltage signals $U_{sA}$, $U_{sB}$, $U_{sC}$ signals for at least one phase A, B, C and by converting said measurements into a digital discrete form to obtain discrete stator current signals and discrete stator voltage signals, the method comprising:

transmitting said digital discrete signals to a computer device wherein data analysis is performed in a processor unit, on the basis of a simplified mathematical model of the dynamics of the motor or generator, said simplified mathematical model being based upon manipulations of a stator voltage equation for a smooth-air-gap machine and a rotor voltage equation for a smooth-air-gap machine, said manipulations involving simplifying assumptions that a complex rotor flux-linkage space phasor in the stationary reference frame changes slowly in comparison to a complex stator flux-linkage space phasor, that ohmic losses in the motor or generator are negligible and that leakage inductances of the motor or generators are low, identifying an average supply frequency value, $\overline{\omega_L}$, from one or more of the discrete stator current signals or discrete stator voltage signals, identifying an average angular speed, $\overline{\dot{\theta}}$ from one or more of the discrete stator current signals or discrete stator voltage signals, identifying an instantaneous phase difference between the discrete stator current signals and the discrete stator voltage signals, $\varnothing_{UI,d}$ from one or more of the discrete stator current signals and one or more of the discrete stator voltage signals, determining an average rotor time constant, $\overline{\tau}_r$ on the basis of the simplified mathematical model of the dynamics of the motor or generator using one or more of the discrete stator current signals and one or more of the discrete stator voltage signals, identifying a discrete instantaneous angular speed $\dot{\theta}_d$ according to the formula:

$$\dot{\theta}_d = \frac{1}{p\overline{\tau}_r}\left(\overline{\omega_L}\overline{\tau}_r + \tan\left(\phi_{UI,d} - \frac{\pi}{2}\right)\right)$$

where:
p is a number of pole pairs of the electric motor
$\overline{\omega_L}$ is an average supply frequency value,
$\overline{\tau}_r$ is an average rotor time constant
$f_{UI,d}$ is an instantaneous phase difference between the discrete stator current signals and the discrete stator voltage signals,
storing the result of combining said data in a memory of the processor unit.

2. The method according to claim 1 wherein the step of determining an average rotor time constant, $\overline{\tau}_r$ is calculated from the formula:

$$\overline{\tau}_r = \frac{\tan\left(\frac{\pi}{2} - \overline{\phi_{UI}}\right)}{\left(\overline{\omega_L} - p\overline{\dot{\theta}}\right)}$$

where: $\overline{\tau}_r$ is an average rotor time constant
p is a number of pole pairs of the electric motor
$\overline{\omega_L}$ is an average supply frequency value,
$\overline{\dot{\theta}}$ an average angular speed,
$\overline{f_{UI}}$ is an arithmetic mean of the instantaneous phase difference between the discrete stator current signals and the discrete stator voltage signals.

3. The method according to claim 1, wherein the step of determining an average rotor time constant, $\overline{\tau}_r$ is calculated from the formula:

$$\overline{\tau}_r = \frac{\tan\left(\frac{\pi}{2} - \cos^{-1}(\phi_{PF})\right)}{\left(\overline{\omega_L} - p\overline{\dot{\theta}}\right)}$$

where: $\overline{\tau}_r$ is an average rotor time constant
p is a number of pole pairs of the electric motor
$\overline{\omega_L}$ is an average supply frequency value,
$\overline{\dot{\theta}}$ an average angular speed,
$f_{PF}$ is a power factor of the motor or generator, derived from nameplate values input, given by the end user or is calculated from the discrete stator current and discrete stator voltage signals.

4. A method for identifying a discrete instantaneous angular speed $\dot{\theta}_d$ of a motor or generator of an electromechanical system, by measuring analog stator current signals $I_{sA}$, $I_{sB}$, $I_{sC}$ for at least one phase A, B, C and by converting said measurements into a digital discrete form to obtain discrete stator current signals, the method further comprising:
transmitting said digital discrete signals to a computer device wherein data analysis is performed in a processor unit, on the basis of a simplified mathematical model of the dynamics of the motor or generator, said simplified mathematical model being based upon manipulations of a stator voltage equation for a smooth-air-gap machine and a rotor voltage equation for a smooth-air-gap machine, said manipulations involving simplifying assumptions that a complex rotor flux-linkage space phasor in the stationary reference frame changes slowly in comparison to a complex stator flux-linkage space phasor, that ohmic losses in the motor or generator are negligible and that leakage inductances of the motor or generators are low, identifying an average supply frequency value, $\overline{\omega_L}$ from one or more of the discrete stator current signals, identifying an average angular speed, $\overline{\dot{\theta}}$ from one or more of the discrete stator current signals, identifying an estimated instantaneous phase difference between the discrete stator current signals and the discrete stator voltage signals, $\varnothing_{UI,d}^*$ from one or more of the discrete stator current signals, by subtracting the discrete phase angle of the complex stator current space phasor from the summation of a first order polynomial fitted to the discrete phase angle of the complex stator current space phasor, $-i_{s,d}$ and the inverse cosine of the power factor of the motor or generator $\varnothing_{PF}$, determining an average rotor time constant, $\overline{\tau}_r$ on the basis of the simplified mathematical model of the dynamics of the motor or generator using one or more of the discrete stator current signals, identifying a discrete instantaneous angular speed $\dot{\theta}_d$ according to the formula:

$$\dot{\theta}_d = \frac{1}{p\tau_r}\left(\overline{\omega_L}\overline{\tau_r} + \tan\left(\phi^*_{UI,d} - \frac{\pi}{2}\right)\right)$$

where:
p is a number of pole pairs of the electric motor
$\overline{\omega}_L$ is an average supply frequency value,
$\overline{\tau}_r$ is an average rotor time constant
$f_{UI,d}$ is an estimated instantaneous phase difference between the discrete stator current signals and the discrete stator voltage signals,
storing the result of combining said data in a memory of the processor unit.

5. The method according to claim 4, wherein the step of determining an average rotor time constant, $\overline{\tau}_r$ is calculated from the formula:

$$\overline{\tau}_r = \frac{\tan\left(\frac{\pi}{2} - \cos^{-1}(\phi_{PF})\right)}{(\overline{\omega_L} - p\dot{\theta})}$$

where: $\overline{\tau}_r$ is an average rotor time constant
p is a number of pole pairs of the electric motor
$\overline{\omega}_L$ is an average supply frequency value,
$\dot{\overline{\theta}}$ is an average angular speed,
$\emptyset_{PF}$ is a power factor of the motor or generator, derived from nameplate values input, given by the end user.

6. The method according to claim 1, wherein the step of identifying an instantaneous phase difference between the discrete stator current signals and the discrete stator voltage signals, $\emptyset_{UI,d}$ is performed by a previous calculation of direct- and quadrature-axis stator current signals, from which a discrete phase angle of the complex stator current space phasor is calculated and by a previous calculation of direct- and quadrature-axis stator voltage signals, from which a discrete phase angle of the complex stator voltage space phasor is calculated and next by subtracting the discrete phase angle of the complex stator voltage space phasor from the discrete phase angle of the complex stator current space phasor and adding a constant phase shift in accordance with whether the motor or generator is connected in star or delta connection.

7. The method according to claim 1, wherein the step of identifying an arithmetic mean of the instantaneous phase difference between the discrete stator current signals and the discrete stator voltage signals, $\overline{\emptyset_{UI}}$, is performed by a calculation an arithmetic mean of the instantaneous phase difference between the discrete stator current signals and the discrete stator voltage signals.

8. The method according to claim 1, wherein the step of identifying an average supply frequency value, $\overline{\omega}_L$, is calculated by transforming one of the discrete stator current signals or discrete voltage signals into the frequency domain and identifying the frequency component at which an amplitude component of the frequency domain signal is greatest.

9. The method according to claim 1, wherein the average angular speed $\dot{\overline{\theta}}$ of the electric motor or generator is identified by calculating a magnitude of the discrete stator current space phasors as a square root of the sum of the squared values of the direct- and quadrature-axis stator current signals, transforming the magnitude of the discrete stator current space phasors into the frequency domain, and identifying the frequency component at which the amplitude component of the frequency domain signal is greatest within a window of frequencies the center of which is located at an initial speed estimate.

10. The method according to claim 9, wherein the initial speed estimate is the synchronous speed of the electric motor or generator, which is calculated by dividing the average power supply frequency by the number of pole pairs.

11. The method according to claim 1, wherein the discrete instantaneous angular speed of the motor or generator is post-processed to remove noise components.

12. The method according to claim 2, wherein the step of identifying an instantaneous phase difference between the discrete stator current signals and the discrete stator voltage signals, $\emptyset_{UI,d}$, is performed by a previous calculation of direct- and quadrature-axis stator current signals, from which a discrete phase angle of the complex stator current space phasor is calculated and by a previous calculation of direct- and quadrature-axis stator voltage signals, from which a discrete phase angle of the complex stator voltage space phasor is calculated and next by subtracting the discrete phase angle of the complex stator voltage space phasor from the discrete phase angle of the complex stator current space phasor and adding a constant phase shift in accordance with whether the motor or generator is connected in star or delta connection.

13. The method according to claim 3, wherein the step of identifying an instantaneous phase difference between the discrete stator current signals and the discrete stator voltage signals, $\emptyset_{UI,d}$, is performed by a previous calculation of direct- and quadrature-axis stator current signals, from which a discrete phase angle of the complex stator current space phasor is calculated and by a previous calculation of direct- and quadrature-axis stator voltage signals, from which a discrete phase angle of the complex stator voltage space phasor is calculated and next by subtracting the discrete phase angle of the complex stator voltage space phasor from the discrete phase angle of the complex stator current space phasor and adding a constant phase shift in accordance with whether the motor or generator is connected in star or delta connection.

14. The method according to claim 2, wherein the step of identifying an arithmetic mean of the instantaneous phase difference between the discrete stator current signals and the discrete stator voltage signals, $\overline{\emptyset_{UI}}$, is performed by a calculation an arithmetic mean of the instantaneous phase difference between the discrete stator current signals and the discrete stator voltage signals.

15. The method according to claim 3, wherein the step of identifying an arithmetic mean of the instantaneous phase difference between the discrete stator current signals and the discrete stator voltage signals, $\overline{\emptyset_{UI}}$, is performed by a calculation an arithmetic mean of the instantaneous phase difference between the discrete stator current signals and the discrete stator voltage signals.

16. The method according to claim 2, wherein the step of identifying an average supply frequency value, $\overline{\omega}_L$, is calculated by transforming one of the discrete stator current signals or discrete voltage signals into the frequency domain and identifying the frequency component at which an amplitude component of the frequency domain signal is greatest.

17. The method according to claim 3, wherein the step of identifying an average supply frequency value, $\overline{\omega}_L$, is calculated by transforming one of the discrete stator current signals or discrete voltage signals into the frequency domain and identifying the frequency component at which an amplitude component of the frequency domain signal is greatest.

18. The method according to claim 2, wherein the average angular speed $\dot{\bar{\theta}}$ of the electric motor or generator is identified by calculating a magnitude of the discrete stator current space phasors as a square root of the sum of the squared values of the direct- and quadrature-axis stator current signals, transforming the magnitude of the discrete stator current space phasors into the frequency domain, and identifying the frequency component at which the amplitude component of the frequency domain signal is greatest within a window of frequencies the center of which is located at an initial speed estimate.

19. The method according to claim 3, wherein the average angular speed $\dot{\bar{\theta}}$ of the electric motor or generator is identified by calculating a magnitude of the discrete stator current space phasors as a square root of the sum of the squared values of the direct- and quadrature-axis stator current signals, transforming the magnitude of the discrete stator current space phasors into the frequency domain, and identifying the frequency component at which the amplitude component of the frequency domain signal is greatest within a window of frequencies the center of which is located at an initial speed estimate.

20. A system for identifying a discrete instantaneous angular speed $\dot{\theta}_d$ of an electric machine receiving multiphase power, the system comprising:
- a current measuring device structured to measure a stator current of one phase of the multiphase power received at a stator of the electric machine;
- a voltage measuring device structured to measure a stator voltage of one phase of the multiphase power received at the stator; and
- a computing device including a data processing unit and a random access memory (RAM) device, the computing device being configured to:
  - receive a discrete stator current measurement corresponding to the stator current measurement and a discrete stator voltage measurement corresponding to the stator voltage measurement,
  - calculate an average supply frequency value, $\overline{\omega_L}$ using the discrete stator current measurement or the discrete stator voltage measurement,
  - calculate an average angular speed, $\dot{\bar{\theta}}$ using the discrete stator current measurement or the discrete stator voltage measurement,
  - calculate an instantaneous phase difference between the discrete stator current measurement and the discrete stator voltage measurement, $\varnothing_{UI,d}$ using the discrete stator current measurement and the discrete stator voltage measurement,
  - determine an average rotor time constant, $\bar{\tau}_r$ on the basis of a simplified mathematical model of the dynamics of the electric machine using the discrete stator current measurement and the discrete stator voltage measurement, and
  - identify the discrete instantaneous angular speed $\dot{\theta}_d$ according to the formula:

$$\dot{\theta}_d = \frac{1}{\rho \tau_T} \left( \overline{\omega_L \tau_r} + \tan\left(\varnothing_{UI,d} - \frac{\pi}{2}\right) \right)$$

where:
p is a number of pole pairs of the electric machine
$\overline{w_L}$ is an average supply frequency value,
$\bar{t}_r$ is an average rotor time constant,
$f_{UI,d}$ is an instantaneous phase difference between the discrete stator current measurement and the discrete stator voltage measurement.

* * * * *